United States Patent [19]

Launes

[11] Patent Number: 4,747,526

[45] Date of Patent: May 31, 1988

[54] TRANSPORTABLE INFANT SEAT

[75] Inventor: Joaquin J. Launes, Barcelona, Spain

[73] Assignee: Play, S.A., Spain

[21] Appl. No.: 22,574

[22] Filed: Mar. 3, 1987

Related U.S. Application Data

[63] Continuation of Ser. No. 783,877, Sep. 24, 1985, abandoned.

[51] Int. Cl.$^4$ ................................................ A45F 4/02
[52] U.S. Cl. .................................... 224/155; 224/159; 224/161; 280/30; 280/647; 280/648
[58] Field of Search ............... 224/151, 153, 155, 158, 224/159, 160, 161; 280/30, 639, 38, 642, 643, 647, 648, 47.25

[56] References Cited

U.S. PATENT DOCUMENTS

| | | | |
|---|---|---|---|
| 3,984,115 | 10/1976 | Miller | 224/161 X |
| 3,989,173 | 11/1976 | Gebhard | 224/161 X |
| 4,157,837 | 6/1979 | Kao | 224/161 X |
| 4,362,307 | 12/1982 | Nakatani | 224/153 |
| 4,586,721 | 5/1986 | Harada et al. | 280/30 |

FOREIGN PATENT DOCUMENTS 153701 11/1969 Spain .

Primary Examiner—Henry J. Recla
Assistant Examiner—David Voorhees
Attorney, Agent, or Firm—McGlew and Tuttle

[57] ABSTRACT

A collapsible infant seat and stroller includes a central frame support having straps so that the frame may be carried as a backpack. A lower part of the frame includes wheels which may be moved between a first inactive position and a second active position. A handle-bar is provided which is pivotably attached to the upper part of the frame so that it may be positioned in a folded position, so that its length is adjacent the length of the frame, and a handle-bar position so that the frame may be pushed along the ground by means of the wheels. A seat is provided which is supported by a seat support member which is pivotably fixed to the upper part of the frame so that the seat may be positioned in an active position and an inactive position. A stabilizing leg is also provided so that the device may be used as a stationary seat.

5 Claims, 1 Drawing Sheet

4,747,526

TRANSPORTABLE INFANT SEAT

FIELD AND BACKGROUND OF THE INVENTION

This application is a continuation of application Ser. No. 783,877, filed Sept. 24, 1985, now abandoned.

The present invention refers to a transportable infant seat of the type comprising a frame provided with belts to hang the seat from the shoulders and rest it against the back, this frame is the holder of a seat-bag for the child.

The applicant in this patent is the owner of the Spanish Utility Model No. 153,701 related to a transportable infant seat having legs pivoted a frame which enable the seat to be rested on the ground.

The infant seat mentioned above fulfills its function of being transportable and arrangeable in the manner of a seat on the ground.

It is an object of the present invention to provide a seat which can be transported in a manner similar to a backpack and which can be used as a stroller and for that purpose, pivotable legs are formed in an U-shaped configuration which can be arranged in an upward direction like a handlebar or handle while the frame may be arranged in a downward direction so a set of pivoted wheels may adopt a passive folding position or a downwardly unfolding position to enable an infant in the seat to be transported over the wheels.

A further object of the present invention is to provide a transportable infant seat having a frame upper setting, from which the seat-bag is hung, which is pivotably fitted to provide the juxtaposed folding as regards the frame and consequently reducing the seat assembly size for easy storage.

Still another object of the present invention is to provide a collapsible infant seat and frame arrangement which may be arranged for use as a stroller and for use as a stationary seat.

To make the disclosure of the invention more understandable, a drawing sheet is attached to the present specification, the drawing showing a practical case of embodiment only provided by way of example non-exhaustive of the scope of the present invention.

Figure 1:
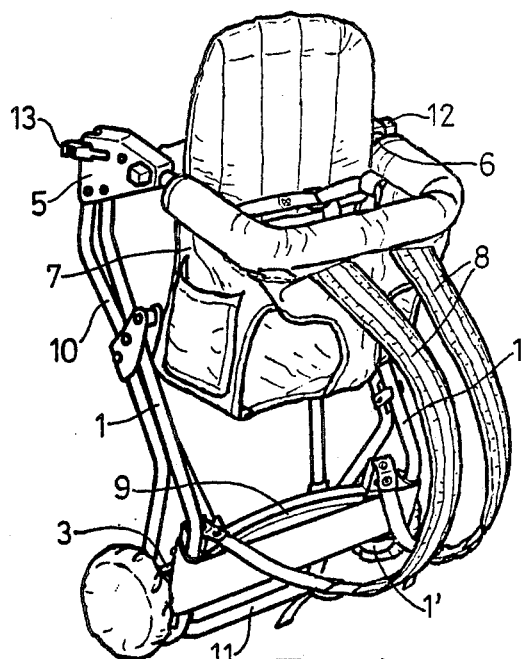
FIG. 1 shows a perspective view of the new transportable seat in the arrangement of being ably loaded on the shoulder.
Figure 2:
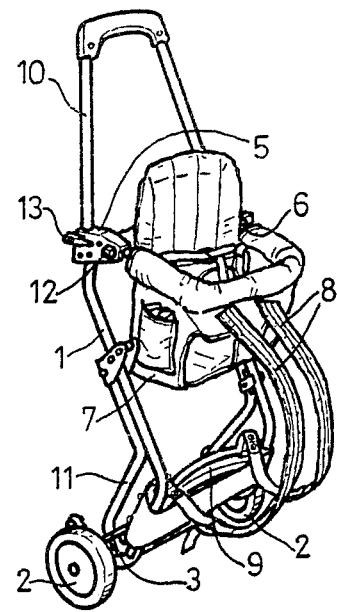
FIG. 2 shows this seat also in a perspective view in the arrangement of being ably transported as a pushchair.
Figure 3:
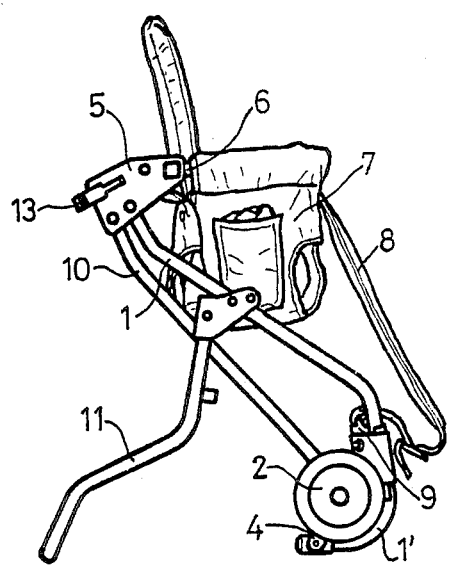
FIG. 3 shows a side elevation view of the seat assembly securely resting on the ground and FIG. 4 also shows in a side elevation view the seat assembly folded.
Figure 4:
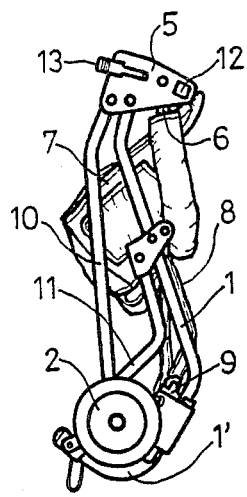

The transportable seat of the present invention comprises a frame composed of two side members -1- folded or bent by its lower end and laterally extending position -1'- where two wheels -2- are arranged mutually related with a transverse shaft or axle -3- and pivotedly fitted by means of extreme connection rods levers or wheel pivot members -4-, these wheels being arranged at a raised passive position, FIGS. 1, 3 and 4 and at the other active lower position, FIG. 2, where the wheels are resting on the ground.

The frame sides -1- at their upward ends include respective heads -5- whereto an upper setting -6- made up with a U-shaped member is pivoted and therefrom a seat-bag -7- and belts -8- are hung, which become gradually engaged with their lower end to an arcuated crossmember -9- fixed between the sides.

At the heads -5-, there is also pivoted an U-shaped member -10- which can ably adopt these positions, one of a juxtaposed folding to the sides -1-, one being raised for use as a handlebar (FIG. 2) to transport the seat as a pushchair on the wheels -2-. The seat additionally is provided with the hinged joint at the sides -1- of another U-shaped member -11- to be operated as legs.

Both the upper setting -6- and the handlebar member -10- are secured at their unfolded position of use by pertinent retainers -12- and -13- provided in the heads -5-.

The seat-bag -7- laterally comprises a pocket wherein two cases for the wheels -2- are arranged, these cases to be located on the wheels when the seat is to be loaded on the shoulders.

I claim:

1. An infant seat comprising:
a pair of spaced apart side members (1) each having upper and lower ends, each side member having at its lower end a bent laterally extending portion (1');
a pivot lever (4) pivotally connected to each laterally extending portion;
a shaft (3) mounted between said pivot levers;
a pair of wheels (2) mounted to said shaft for rotation, said pivot levers being pivotal between a raised position and a lowered position, said shaft and said wheels both being above said bent laterally extended portions with said pivot levers in their raised position, and being below said laterally extending portions with said pivot levers being in their lowered position, whereby with said pivot levers in their raised position, said wheels are peripherally protected by said bent laterally extended portions;
a head (5) connected to said upper end of each side member;
a bag support member (6) pivotally mounted between said heads;
a seat bag (7) connected to and suspended from said seat bag support member;
a cross member (9) connected between said side members for holding said side members apart, said cross member being connected between said side members at a location spaced away from said heads;
a pair of shoulder straps (8) each connected between said seat bag support member and said cross member for permitting carrying of the infant seat on the shoulders of a person; and
a U-shaped handle bar (10) connected between said heads for pivoting from a use position extending upwardly from said upper end of said side members and a folded position extending downwardly along said side members.

2. An infant seat according to claim 1, wherein said seat supporting member comprises a U-shaped member connected between said heads, said heads including means for supporting said U-shaped member at a use position for extending said bag seat for use by an infant, and a folded position extending substantially parallel to said side members.

3. An infant seat according to claim 2, including a U-shaped leg member (11) pivotally mounted between said side members at intermediate locations on said side members between upper and lower ends thereof, said leg member being pivotally connected for movement between a support position spaced away from said wheels for supporting the infant seat, and a folded position adjacent said wheels.

4. An infant seat according to claim 1, including a U-shaped leg member (11) pivotally mounted between said side members at intermediate locations on said side members between upper and lower ends thereof, said leg member being pivotally connected for movement between a support position spaced away from said wheels for supporting the infant seat, and a folded position adjacent said wheels.

5. An infant seat according to claim 4, wherein, with said handle member and leg member folded, and said pivot lever in its raised position, said shaft is positioned between said leg member and said handle member on one side, and said side members on the other side.

* * * * *